US012675948B2

(12) United States Patent
Grguric et al.

(10) Patent No.: US 12,675,948 B2
(45) Date of Patent: Jul. 7, 2026

(54) SYSTEM AND METHOD FOR CONSTRUCTIVE SOLID GEOMETRY OPERATIONS

(71) Applicant: Roblox Corporation, San Mateo, CA (US)

(72) Inventors: Izak Grguric, Vancouver (CA); Loïc Le Feuvre, North Vancouver (CA)

(73) Assignee: Roblox Corporation, San Mateo, CA (US)

( * ) Notice: Subject to any disclaimer, the term of this patent is extended or adjusted under 35 U.S.C. 154(b) by 259 days.

(21) Appl. No.: 18/539,902

(22) Filed: Dec. 14, 2023

(65) Prior Publication Data

US 2024/0203051 A1 Jun. 20, 2024

Related U.S. Application Data

(60) Provisional application No. 63/432,936, filed on Dec. 15, 2022.

(51) Int. Cl.
| | |
|---|---|
| *G06T 17/10* | (2006.01) |
| *G06T 17/20* | (2006.01) |
| *G06T 19/20* | (2011.01) |

(52) U.S. Cl.
CPC .............. *G06T 17/10* (2013.01); *G06T 17/20* (2013.01); *G06T 19/20* (2013.01); *G06T 2210/21* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 2004/0088146 A1* | 5/2004 | Forest | ..................... | G06T 17/00 |
| | | | | 703/2 |
| 2015/0332487 A1* | 11/2015 | Williams | ................ | G06T 17/20 |
| | | | | 345/441 |
| 2019/0295297 A1* | 9/2019 | Mason | ..................... | G06T 17/20 |
| 2019/0304193 A1* | 10/2019 | Byrd, Jr. | ............... | G06T 17/005 |

(Continued)

OTHER PUBLICATIONS

Bernstein, et al., "Fast, Exact, Linear Booleans", Computer Graphics Forum. vol. 28. No. 5. Oxford, UK: Blackwell Publishing Ltd, 2009, 10 pages.

(Continued)

*Primary Examiner* — Andrew G Yang
(74) *Attorney, Agent, or Firm* — IP Spring

(57) ABSTRACT

A computer-implemented method includes creating a list of intersecting convex polygonal faces based on results of a constructive solid geometry operation that is applied to a first object and a second object. The method further includes generating a first treelet from a first set of faces associated with the first object. The method further includes identifying whether first fragments in the first set of faces are inside second objects. The method further includes creating a second treelet. The method further includes identifying whether second fragments in the second set of faces are inside the first object. The method further includes responsive to the identifying, determining whether there is a union, intersection, or subtraction for each pair in the list of intersecting convex polygonal faces. The method further includes assembling the set of first fragments and the set of second fragments to create a topological structure.

20 Claims, 7 Drawing Sheets

(56) References Cited

U.S. PATENT DOCUMENTS

| | | | | |
|---|---|---|---|---|
| 2019/0392100 A1* | 12/2019 | Cha | .................... | G06F 30/398 |
| 2020/0188206 A1* | 6/2020 | Hempel | ................ | G16H 40/63 |
| 2021/0158612 A1* | 5/2021 | Cao | .................... | G06T 19/20 |
| 2021/0358210 A1* | 11/2021 | Yu | .................... | G06T 17/10 |
| 2023/0306699 A1* | 9/2023 | Liang | .................... | A41H 3/007 |

OTHER PUBLICATIONS

Campen, et al., "Exact and robust (self-) intersections for polygonal meshes", Computer Graphics Forum. vol. 29. No. 2. Oxford, UK: Blackwell Publishing Ltd, 2010, 10 pages.
Naylor, et al., "Merging BSP trees yields polyhedral set operations", ACM Siggraph Computer Graphics 24.4, 1990, pp. 115-124.
Shewchuk, "Adaptive precision floating-point arithmetic and fast robust geometric predicates", Discrete & Computational Geometry 18.3, 1997, pp. 305-363.
Trettner, et al., "EMBER: exact mesh booleans via efficient & robust local arrangements", ACM Transactions on Graphics (TOG) 41.4, 2022, pp. 1-15.
Zhou, et al., "Mesh Arrangements for Solid Geometry", ACM Transactions on Graphics (TOG) 35.4, 2016, pp. 1-15.

* cited by examiner

350

380

Figure 5:
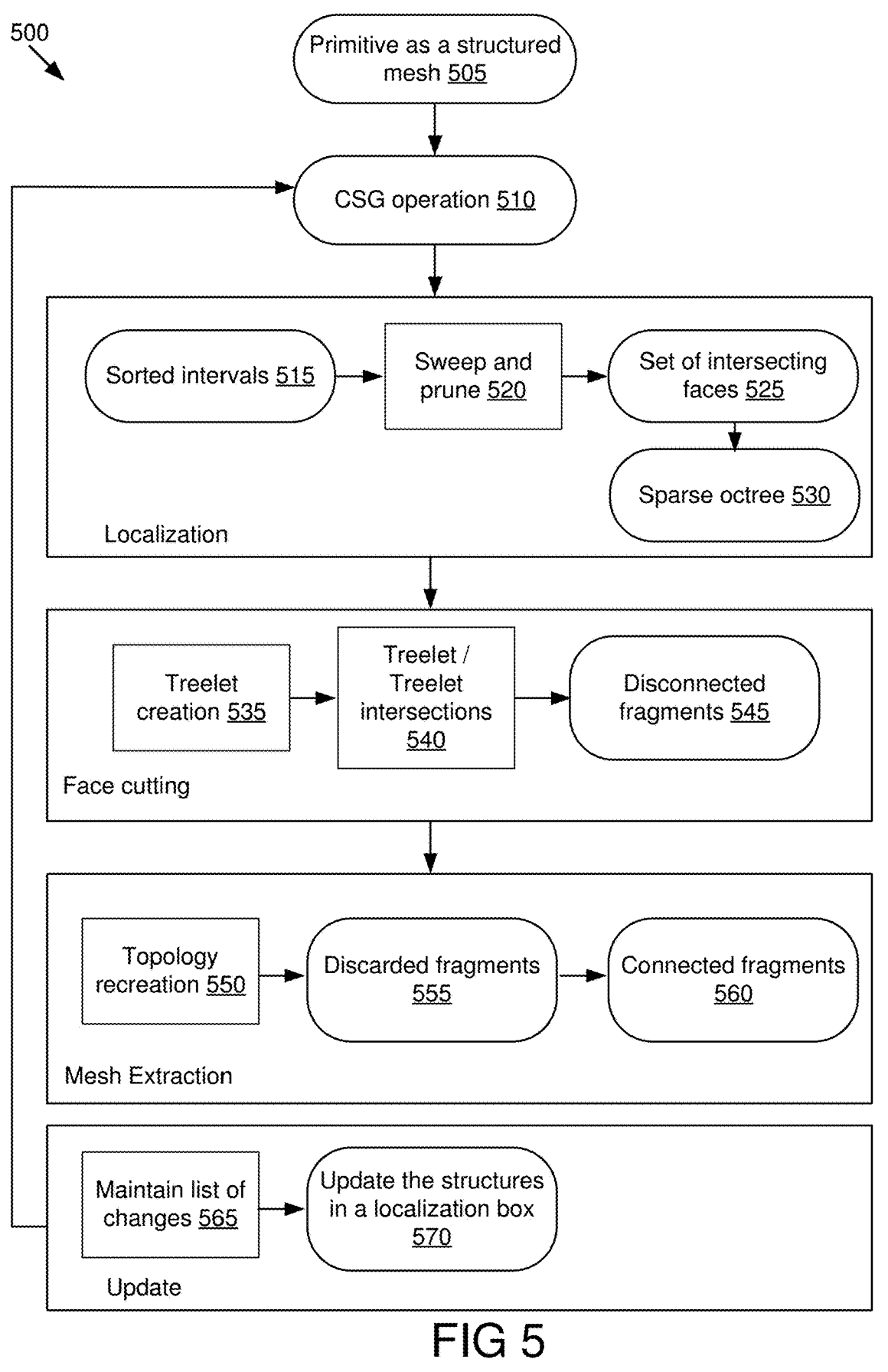

500

Primitive as a structured mesh 505

CSG operation 510

Localization

Sorted intervals 515 → Sweep and prune 520 → Set of intersecting faces 525

Set of intersecting faces 525 → Sparse octree 530

Face cutting

Treelet creation 535 → Treelet / Treelet intersections 540 → Disconnected fragments 545

Mesh Extraction

Topology recreation 550 → Discarded fragments 555 → Connected fragments 560

Update

Maintain list of changes 565 → Update the structures in a localization box 570

Create a list of intersecting convex polygonal faces based on results of a CSG operation that is applied to a first object and a second object 602

↓

Generate a first treelet from a first set of faces associated with the first object from each pair in the list of intersecting convex polygonal faces 604

↓

Identify whether first fragments in the first set of faces are inside the second object 606

↓

Create a second treelet from the second set of faces associated with the second object from each pair in the list of intersecting convex polygonal faces 608

↓

Identify whether second fragments in the second set of faces are inside the first object 610

↓

Responsive to the identifying, determine whether there is a union, intersection, or subtraction of the first object and the second objects for each pair in the list of intersecting convex polygonal faces 612

↓

Assemble the set of first fragments and the set of second fragments to create a topological structure based on the determinations of union, intersection, and subtraction 614

FIG 6

SYSTEM AND METHOD FOR CONSTRUCTIVE SOLID GEOMETRY OPERATIONS

CROSS-REFERENCE TO RELATED APPLICATIONS

The present application claims priority to U.S. Provisional Patent Application No. 63/432,936, filed on Dec. 15, 2022 and titled "System and Method for Constructive Solid Geometry Operations," which is incorporated by reference herein in its entirety.

BACKGROUND

Constructive solid geometry is used to create complex shapes by assembling simple primitives through operations, such as union, subtraction, or intersection. The result can be represented either by its boundary, for example, a triangular mesh, or by a tree structure, which is the blueprint of the object. This approach is a computationally expensive process for solid geometry constructive solid geometry operations and prevents real-time assembly of three-dimensional objects.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments relate generally to a method to create a topological structure. The method includes creating a list of intersecting convex polygonal faces based on results of a constructive solid geometry (CSG) operation that is applied to a first object and a second object. The method further include generating a first treelet from a first set of faces associated with the first object from each pair in the list of intersecting convex polygonal faces. The method further includes identifying whether first fragments in the first set of faces are inside second objects. The method further includes creating a second treelet from the second set of faces from each pair in the list of intersecting convex polygonal faces. The method further includes identifying whether second fragments in the second set of faces are inside the first object. The method further includes responsive to the identifying, determining whether there is a union, intersection, or subtraction for each pair in the list of intersecting convex polygonal faces. The method further includes assembling the set of first fragments and the set of second fragments to create a topological structure based on the determinations of union, intersection, and subtraction.

In some embodiments, prior to creating the list of intersecting convex polygonal faces, the method further includes applying the CSG operation to the first object and the second object, determining triangles that are left unchanged by the CSG operation, applying a sweep and prune algorithm to the triangles to determine a list of intersecting triangles, and extracting the list of intersecting convex polygonal faces from the list of intersecting triangles. In some embodiments, determining whether the first fragments in the first set of faces are inside the second object is based on determining whether a vertex of the first fragments lie below, above, or on a plane of the second set of faces. In some embodiments, the method further includes maintaining a list of added fragments that are added to the topological structure and discarded fragments that are not added to the topological structure and transmitting, from a server to a client device, information about the list of added fragments and discarded fragments, wherein transmitting the information about the list incrementally enables the client device to incrementally form the topological structure. In some embodiments, the topological structure is a collar that is added to a mesh created by the CSG operation. In some embodiments, the topological structure is a closed two-manifold mesh.

In some embodiments, the union of the first object and the second object is determined based on determining that a first face of the first object intersects with the second object, a first fragment of the first face is inside the second object, a second face of the second object intersects with the first object, and a second fragment of the second face is inside the first object. IN some embodiments, the intersection of the first object and the second object is determined based on determining that a first face of the first object intersects with the second object, a first fragment of the first face is outside the second object, a second face of the second object intersects with the first object, and a second fragment of the second face is outside the first object. In some embodiments, the subtraction of the second object from the first object is determined based on determining that a first face of the first object intersects with the second object, a first fragment of the first face is inside the second object, a second face of the second object intersects with the first object, and a second fragment of the second face is outside the first object.

A device to create a topological structure includes a processor and a memory coupled to the processor, with instructions stored thereon that, when executed by the processor, cause the processor to perform operations. The operations include creating a list of intersecting convex polygonal faces based on results of a CSG operation that is applied to a first object and a second object, generating a first treelet from a first set of faces associated with the first object from each pair in the list of intersecting convex polygonal faces, identifying whether first fragments in the first set of faces are inside second objects, creating a second treelet from the second set of faces from each pair in the list of intersecting convex polygonal faces, identifying whether second fragments in the second set of faces are inside the first object, responsive to the identifying, determining whether there is a union, intersection, or subtraction for each pair in the list of intersecting convex polygonal faces, and assembling the set of first fragments and the set of second fragments to create a topological structure based on the determinations of union, intersection, and subtraction.

In some embodiments, prior to creating the list of intersecting convex polygonal faces, the operations further include applying the CSG operation to the first object and the second object, determining triangles that are left unchanged by the CSG operation, applying a sweep and prune algorithm to the triangles to determine a list of intersecting triangles, and extracting the list of intersecting convex polygonal faces from the list of intersecting triangles. In some embodiments, determining whether the first fragments in the first set of faces are inside the second object is based on determining whether a vertex of the first fragments lie below, above, or on a plane of the second set of faces. In some embodiments, the operations further include maintaining a list of added fragments that are added to the topological structure and discarded fragments that are not added to the topological structure and transmitting, from a server to a client device, information about the list of added fragments and discarded fragments, wherein transmitting the information about the list incrementally enables the client device to incrementally form the topological structure. In some embodiments, the topological structure is a collar that is added to a mesh created by the CSG operation.

A non-transitory computer-readable medium with instructions to create a topological structure stored thereon that, when executed by one or more computers, cause the one or more computers to perform operations. The operations include creating a list of intersecting convex polygonal faces based on results of a CSG operation that is applied to a first object and a second object, generating a first treelet from a first set of faces associated with the first object from each pair in the list of intersecting convex polygonal faces, identifying whether first fragments in the first set of faces are inside second objects, creating a second treelet from the second set of faces from each pair in the list of intersecting convex polygonal faces, identifying whether second fragments in the second set of faces are inside the first object, responsive to the identifying, determining whether there is a union, intersection, or subtraction for each pair in the list of intersecting convex polygonal faces, and assembling the set of first fragments and the set of second fragments to create a topological structure based on the determinations of union, intersection, and subtraction.

In some embodiments, prior to creating the list of intersecting convex polygonal faces, the operations further include applying the CSG operation to the first object and the second object, determining triangles that are left unchanged by the CSG operation, applying a sweep and prune algorithm to the triangles to determine a list of intersecting triangles, and extracting the list of intersecting convex polygonal faces from the list of intersecting triangles. In some embodiments, determining whether the first fragments in the first set of faces are inside the second object is based on determining whether a vertex of the first fragments lie below, above, or on a plane of the second set of faces. In some embodiments, the operations further include maintaining a list of added fragments that are added to the topological structure and discarded fragments that are not added to the topological structure and transmitting, from a server to a client device, information about the list of added fragments and discarded fragments, wherein transmitting the information about the list incrementally enables the client device to incrementally form the topological structure. In some embodiments, the topological structure is a collar that is added to a mesh created by the CSG operation. In some embodiments, the topological structure is a closed two-manifold mesh.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

BRIEF DESCRIPTION OF THE DRAWINGS

FIG. 5 is an example flow diagram of a method to generate a topological structure, according to some embodiments described herein.

FIG. 6 is an example flow diagram of a method to generate a topological structure from treelets, according to some embodiments described herein.

DETAILED DESCRIPTION

Assembling a topological structure, such as a three-dimensional (3D) body to create an avatar for a virtual experience, includes creating a polygonal mesh that represents the results of a constructive solid geometry (CSG) operation. Using floating-point operations to create the topological structure from a CSG operation results in errors or invalid results based on inherent inaccuracies in the floating-point operations. Using exact arithmetic predicates for the operations is more accurate, but too computationally expensive to be used for every operation. As a result, creating the 3D body may take too long or be too computationally expensive using conventional methods.

The technology described herein advantageously solves the problem by using precision floating-point arithmetic during CSG operations. In some embodiments, a metaverse engine applies a CSG operation to a first object and a second object, determines a list of intersecting convex polygonal faces, generates treelets based on the list of intersecting convex polygonal faces, creates a topology from fragments of the convex polygonal faces to form connected fragments, and forms a structured mesh out of the first object and the second object. As a result, the metaverse engine quickly assembles the structured mesh while maintaining accuracy.

Network Environment 100

Figure 1:
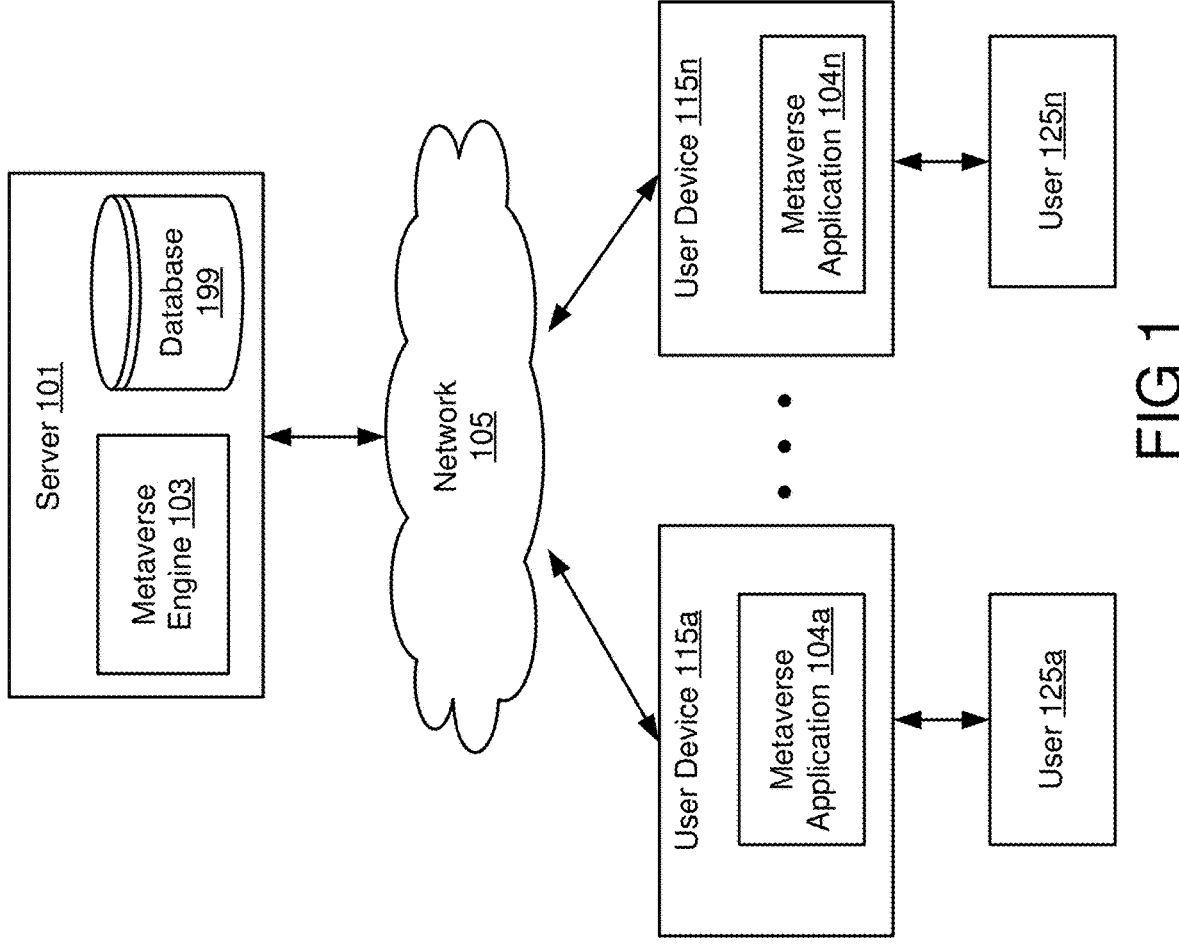
FIG. 1 is a block diagram of an example network environment, according to some embodiments described herein.
Figure 1:

FIG. 1 illustrates a block diagram of an example environment 100 to generate a mesh. In some embodiments, the environment 100 includes a server 101, user devices 115a . . . n, and a network 105. Users 125a . . . n may be associated with the respective user devices 115a . . . n. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number. In some embodiments, the environment 100 may include other servers or devices not shown in FIG. 1. For example, the server 101 may be multiple servers 101.

The server 101 includes one or more servers that each include a processor, a memory, and network communication hardware. In some embodiments, the server 101 is a hardware server. The server 101 is communicatively coupled to the network 105. In some embodiments, the server 101 sends and receives data to and from the user devices 115. The server 101 may include a metaverse engine 103 and a database 199.

The metaverse engine 103 includes code and routines operable to apply a CSG operation to a first object and a second object, determine a list of intersecting convex polygonal faces, generate a first treelet from a first set of faces associated with the first object from each pair in the list of intersecting convex polygonal faces, and identify whether first fragments in the first set of faces are inside second objects. The metaverse engine 103 creates a second treelet from the second set of faces from each pair in the list of intersecting convex polygonal faces and identifies whether second fragments in the second set of faces are inside the first object. Responsive to the determining, the metaverse engine 103 determines whether there is a union, intersection, or subtraction for each of the intersecting convex polygonal faces and assembles the set of first fragments and the set of second fragments to create a topological structure based on the determinations of union, intersection, and subtraction.

In some embodiments, the metaverse engine 103 is implemented using hardware including a central processing unit (CPU), a field-programmable gate array (FPGA), an application-specific integrated circuit (ASIC), any other type of processor, or a combination thereof. In some embodiments, the metaverse engine 103 is implemented using a combination of hardware and software.

The database 199 may be a non-transitory computer readable memory (e.g., random access memory), a cache, a drive (e.g., a hard drive), a flash drive, a database system, or another type of component or device capable of storing data. The database 199 may also include multiple storage components (e.g., multiple drives or multiple databases) that may also span multiple computing devices (e.g., multiple server computers). The database 199 may store data associated with the metaverse engine 103, such as previously generated meshes, topological structures, etc.

The user device 115 may be a computing device that includes a memory and a hardware processor. For example, the user device 115 may include a mobile device, a tablet computer, a mobile telephone, a wearable device, a head-mounted display, a mobile email device, a portable game player, a portable music player, a reader device, or another electronic device capable of accessing a network 105 and capturing images with a camera.

User device 115a includes metaverse application 104a and user device 115n includes metaverse application 104n. In some embodiments, the user 125a interacts with the metaverse application 104a by requesting that a three-dimensional character be displayed. In some embodiments, the metaverse application 104a receives graphical data for displaying the 3D avatar generated by the metaverse engine 103. For example, the metaverse application 104a may receive portions of the 3D avatar as they are generated by the metaverse engine 103.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the server 101 and the user devices 115, in practice one or more networks 105 may be coupled to these entities.

Computing Device Example 200

Figure 2:
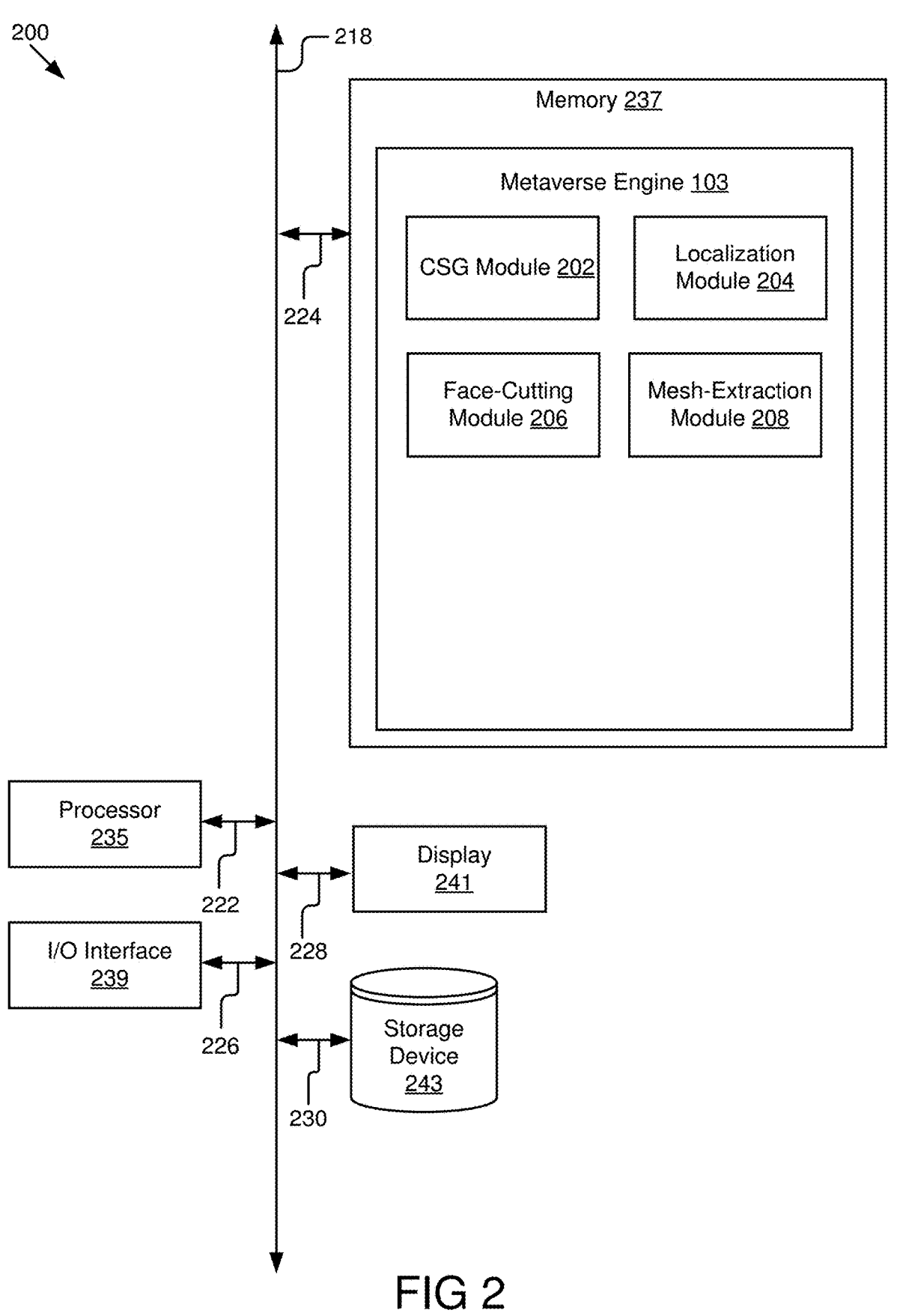
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the server 101. In some embodiments, the computing device 200 is the user device 115.

In some embodiments, computing device 200 includes a processor 235, a memory 237, an Input/Output (I/O) interface 239, a display 241, and a storage device 243. Depending on whether the computing device 200 is the server 101 or the user device 115, some components of the computing device 200 may not be present. For example, in instances where the computing device 200 is the server 101, the computing device may not include the display 241. In some embodiments, the computing device 200 includes additional components not illustrated in FIG. 2.

The processor 235 may be coupled to a bus 218 via signal line 222, the memory 237 may be coupled to the bus 218 via signal line 224, the I/O interface 239 may be coupled to the bus 218 via signal line 226, the display 241 may be coupled to the bus 218 via signal line 228, and the storage device 243 may be coupled to the bus 218 via signal line 230.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the metaverse engine 103, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 243), and input/output devices can communicate via I/O interface 239. In some embodiments, the I/O interface 239 can connect to interface devices such as input devices (keyboard, pointing device, touchscreen, sensors, etc.) and/or output devices (display devices, speaker, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. Display 241 can include any suitable display device such as a liquid crystal display (LCD), light emitting diode (LED), or plasma display screen, cathode ray tube (CRT), television, monitor, touchscreen, three-dimensional display screen, or other visual display device.

The storage device 243 stores data related to the metaverse engine 103. For example, the storage device 243 may store training data sets for the trained machine-learning model, a history and metadata associated with each user 125, etc. In embodiments where the computing device 200 is the server 101, the storage device 247 is the same as the database 199 in FIG. 1.

Example Metaverse Engine 103

FIG. 2 illustrates a computing device 200 that executes an example metaverse engine 103 that includes a constructive solid geometry (CSG) module 202, a localization module 204, a face-cutting module 206, and a mesh-extraction module 208.

Floating point operations carry inaccuracies. Any geometric algorithm relying on floating point inaccuracies will suffer from inconsistent predicates leading to errors or invalid results. To circumvent these issues, the metaverse engine 103 uses exact arithmetic predicates. A geometric predicate is a numerical test that takes a limited number of geometric parameters and returns a discrete answer. The predicate used in the description below is the orientation predicate, which determines whether a vertex lies below, above, or on a plane. This position is dictated by the sign of the result of a computation. The face-cutting module 206 calculates this result using exact arithmetic, specifically adaptive precision floating-point arithmetic, which guarantees that the sign of the result (but maybe not the result itself) will be the same as if it was computed using arithmetic over real numbers (i.e., infinite precision).

This implies a useful property if (1) the original geometric data is consistent in real number arithmetic or independent, and if (2) all algorithmic decision making is based on the sign of the orientation predicate evaluated on the original data (i.e., no derived data is fed to the predicate), then the algorithm will be robust and the result obtained correctly.

CSG operations do not create new planes. If the CSG module 202 performs a union of a first primitive and a second primitive, the result will only include planes from either the first primitive or the second primitive. As a result, when an algorithm is defined in terms of planes (i.e., original, consistent input data) and uses only planes as input parameters of the exact predicates, accuracy and correctness are maintained. In other words, the algorithm does not use derived data (i.e., data calculated from the input data) to make decisions.

In some embodiments, the CSG module 202 receives geometric primitives (objects), which are any convex polyhedrons, such as a tetrahedron, a cube, an octahedron, a dodecahedron, and an icosahedron. Objects define volumes that are meshes. The CSG module 202 assembles the objects into a complex shape through operations, such as union, subtraction, or intersection, by determining how a first object overlaps with a second object.

Figure 3A:
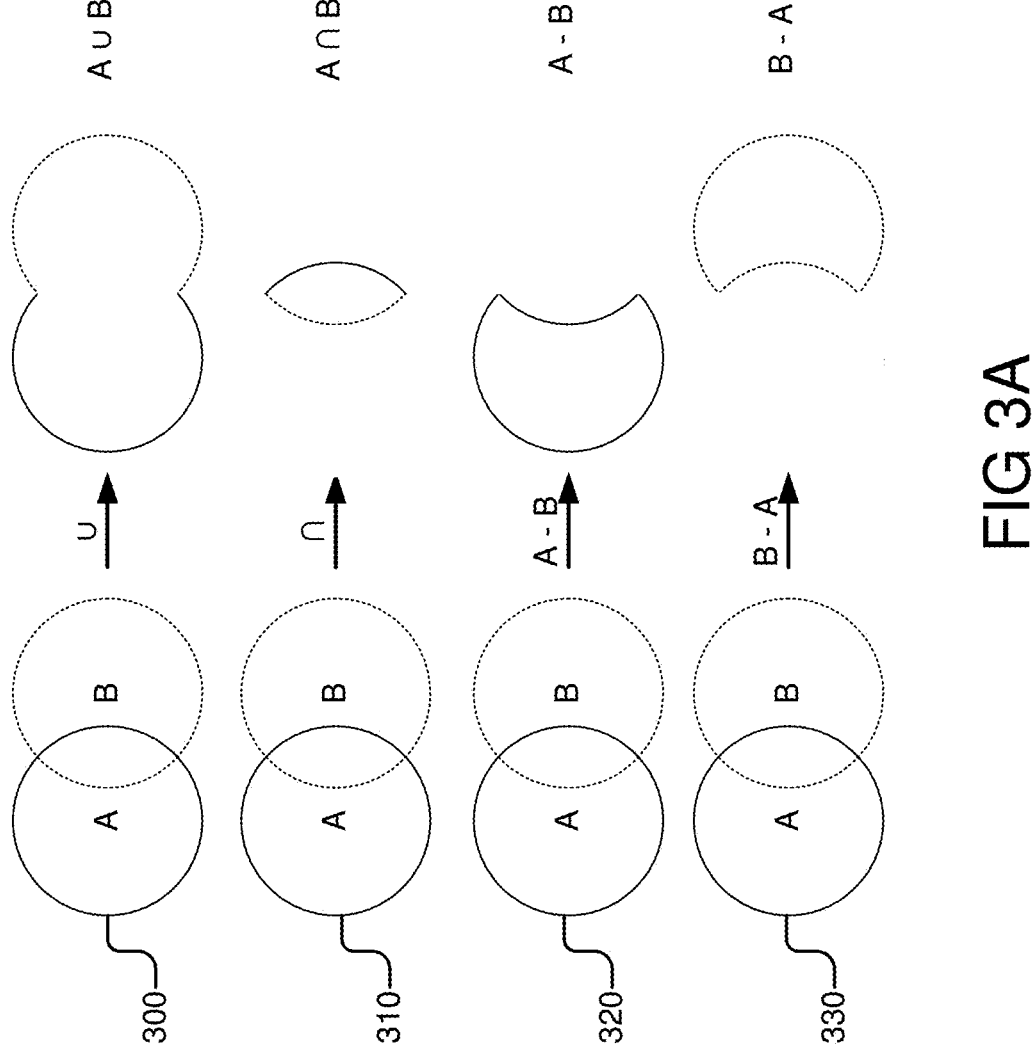
FIG. 3A includes examples of union, intersection, and subtraction, according to some embodiments described herein.

FIG. 3A includes examples of union 300, intersection 310, and the two types of subtraction 320, 330. Union 300 occurs when two objects are combined into a single object. Intersection 310 occurs when a volume from a first object that is inside a second object and a second object that is inside a first object remains. Subtraction 320 of a first object from a second object occurs when the first object that is outside the second object remains. Subtraction 330 of a second object from a first object occurs when the second object that is outside the first object remains.

In some embodiments, the output of CSG operations is a CSG tree and a mesh. The CSG tree is a binary tree where leaves of the tree represent primitives and nodes represent operations (e.g., union, subtraction, intersection). The mesh (e.g., a triangular mesh) is a collection of vertices, edges, and faces that define the shape of a 3D model. The mesh represents objects as a set of faces where the faces are convex polygons (n-sided faces). Each face includes a support plane and closed loop of half edges, each of which has a plane.

Figure 3B:
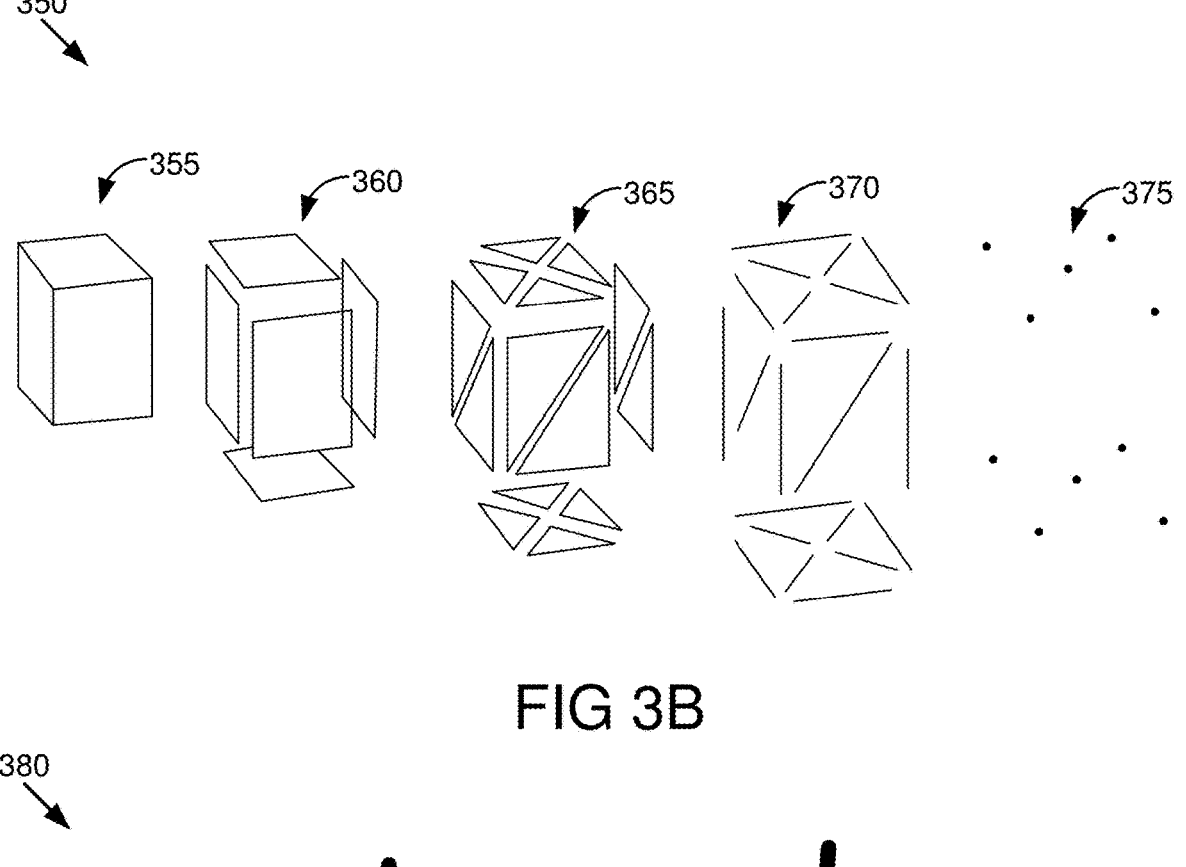
FIG. 3B includes an example of how a structure may be described, according to some embodiments described herein.

FIG. 3B includes an example 350 of different structures. A cuboid 355 is a 3D rectangle. A polygon 360 is a plane closed shape bounded with straight sides. Faces 365 are in closed sets of edges lying on a common plane (a planar face). An edge 370 is a line segment joining two vertices in a polygon. A vertex 375 is a point where two or more edges meet. As will be described in greater detail below, when a face is cut by a plane, the part of the face that is cut is a fragment (not illustrated).

Figure 3C:
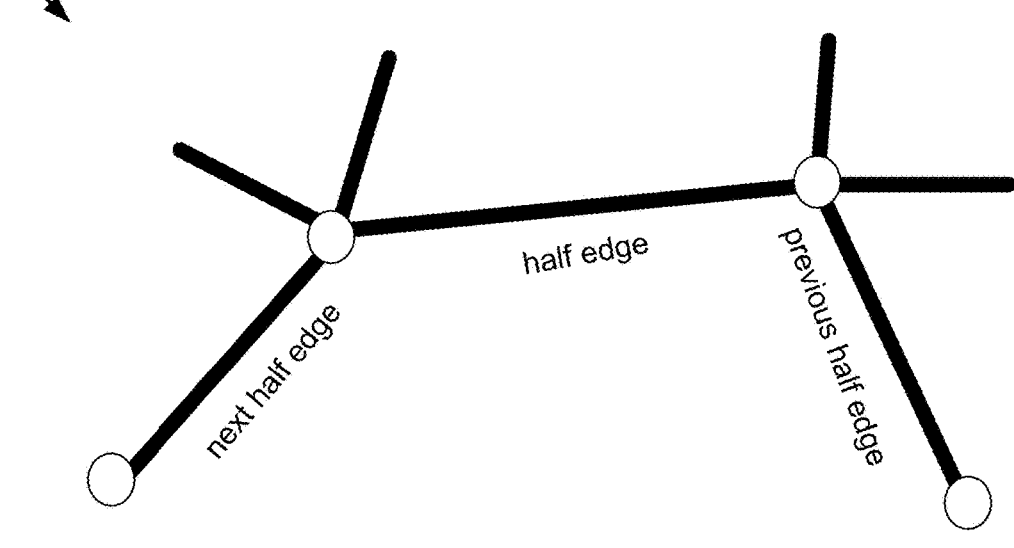
FIG. 3C includes an example half edge data structure, according to some embodiments described herein.

FIG. 3C includes an example half edge data structure 380 that includes a half edge connected to a next half edge and a previous half edge. For any entity of the mesh, vertices are defined by the intersection of a support plane and two consecutive half edge planes (also known as loop planes). Edges are defined by a segment, lying on the intersection of two planes (i.e., the support plane and the corresponding half edge plane), bounded by two vertices that were previously determined.

The CSG module 202 performs convex decomposition of the mesh for rendering and simulation purposes by cutting faces into convex fragments. As a result of this process, the CSG module 202 creates T-junctions, which occur when one of the two faces that share an edge is cut, but the other face is not cut. T-junction is therefore autological in that it refers to the shape of the cut, which looks like the letter "T." T-junctions may be addressed by the face-cutting module 206 when the face-cutting module 206 traverses a binary space partition (BSP) tree at each edge, finds missing planes that intersect the edge, and splits the opposite half edge. However, this is too computationally expensive because the exact predicates are needed to traverse the BSP tree and determine whether a plane intersects an edge or not. The description below identifies a faster solution for fixing T-junctions in a computationally efficient way.

Designing a numerical algorithm for determining the intersection of planes to assemble a topological structure that is simultaneously robust, accurate, and performant is difficult. In most algorithms, robustness and accuracy are achieved at the expense of performance. To alleviate the performance cost of using exact arithmetic predicates, the localization module 204 reduces the number of times that the face-cutting module 206 performs the algorithm. In one embodiment, the localization module 204 determines confidence intervals from the predicates to determine thresholds above which floating point versions of the predicates are safe to use. In some embodiments, the localization module 204 localizes the CSG operations. In some embodiments, the localization module 204 both determines confidence intervals and localizes the CSG operations.

In some embodiments, the localization module 204 localizes the CSG operations by using data structure queries to filter out primitives and elements of the primitives (i.e., faces and triangles) that are left unchanged by the CSG operation. The localization module 204 may perform a first level of filtering that is a naïve check on the bounding boxes of the primitives. The first level of filtering is very efficient but has a limited filtering rate.

The localization module 204 may perform a second level of filtering by applying a sweep and prune (SAP) algorithm on triangles to identify a number of pairs of triangles that intersect each other.

In some embodiments, the localization module 204 converts each primitive polygonal face into a one or more triangles. The localization module 204 inserts the bounding box of each triangle into a SAP structure. The localization module 204 applies the SAP algorithm to quickly retrieve potential bounding box pairs of intersecting triangles.

The SAP structure may be efficiently updated after each CSG operation. In some embodiments, the SAP structure reflects the structure of the CSG tree, such as the layout corresponding to the depth-first search of the tree. The pairs of bounding boxes are a first estimate of triangles that may intersect. The localization module 204 performs a triangle-triangle intersection check to obtain a list of intersection triangles. The triangle-triangle check is a quick process that does not result in false negatives. Specifically, the triangle-triangle check advantageously ensures that no triangle-triangle pair is rejected if such a rejection would create contradiction in exact arithmetic orientation predicate computation in subsequent processes.

Figure 4:
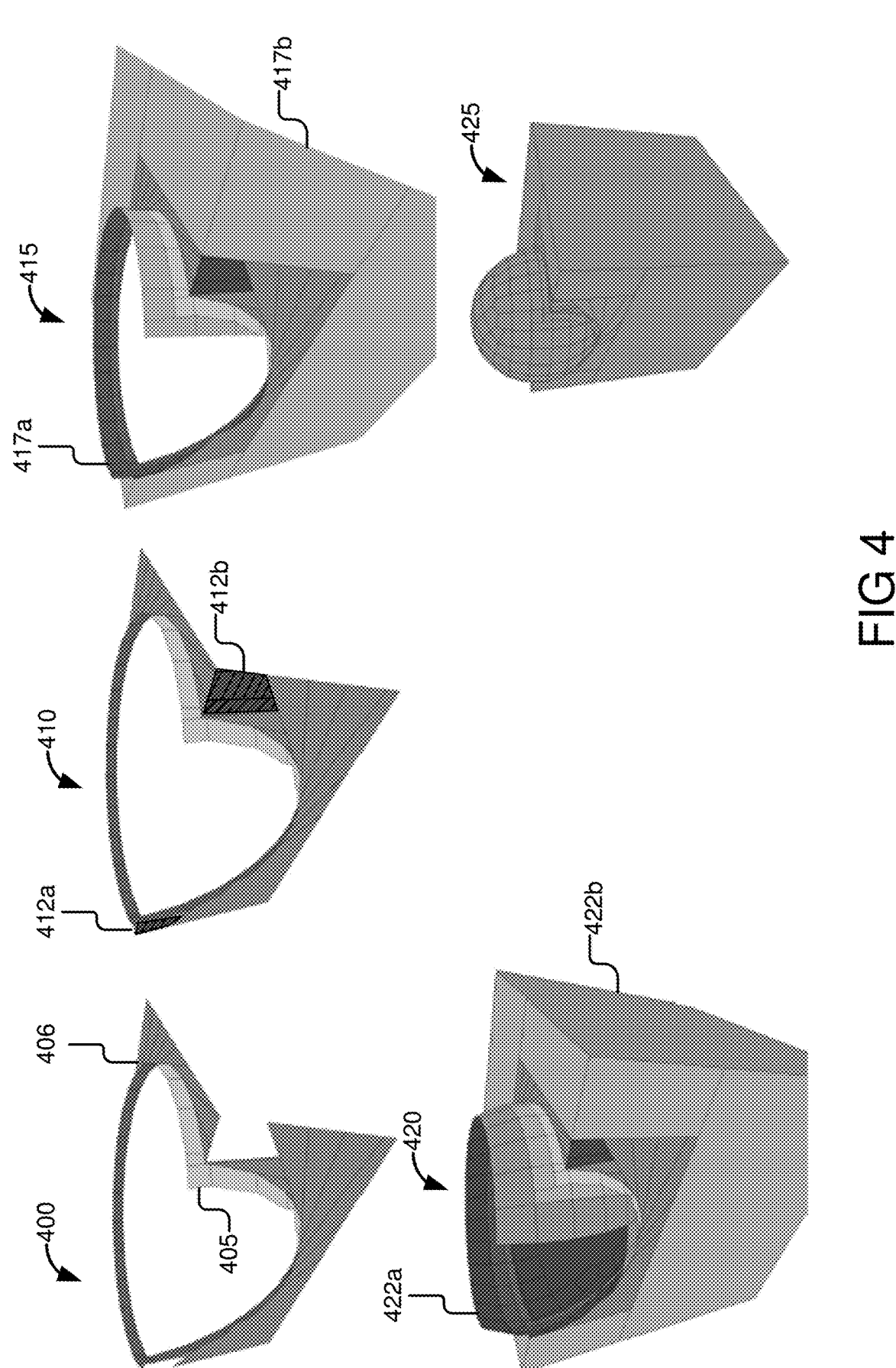
FIG. 4 includes an example of a collar that is formed from fragments of objects, according to some embodiments described herein.

The localization module 204 extracts a list of pairs of intersecting convex polygonal faces from the list of intersecting triangles. Each pair of intersecting convex polygonal faces consists of a face of one operand and a face of the other operand where the two faces intersect each other. Because both operands in a pair are closed two-manifolds, the position of the intersection between the operands may generally be a set of closed loops. The list of intersecting faces forms a neighborhood of the intersection loops, which is referred to as an "intersection collar" due to its shape, which appears similar to a collar that joins more simple structures. An example of an intersection collar is illustrated in FIG. 4 and described in detail below.

In some embodiments, the face-cutting module 206 receives the list of pairs of intersecting convex polygonal faces from the localization module 204 and generates a partial BSP tree that is herein referred to as a "treelet." In some embodiments, the localization module 204 generates a first treelet from a first set of faces from each pair in the list of pairs of intersecting convex polygonal faces. The localization module 204 identifies a set of first fragments for first objects that overlap with an interior of second objects from each pair in the list of intersecting convex polygonal faces.

The face-cutting module 206 may repeat the process with the first set of faces and the second set of faces reversed. Specifically, the face-cutting module 206 may generate a second treelet from the second set of faces from each pair in the list of intersecting convex polygonal faces and identify a set of second fragments that overlap with an interior of first objects from each pair in the list of intersecting convex polygonal faces. Since the treelets are not full BSP trees, the face-cutting module 206 does not derive full classification of all the fragments and discards those that do not contribute to the final result. Instead, those steps are performed by the mesh-extraction module 208 as discussed in greater detail below.

The face-cutting module 206 determines whether there is a union, intersection, or subtraction of the first objects and the second objects. For example, the union of a first object and a second object is defined by the following set:

$$F1 \text{ of } A \text{ such that } F1 \cap bB \neq \phi$$
$$f1 \text{ of } F1 \text{ such that } f1 \subset B$$

10

-continued
$$F2 \text{ of } B \text{ such that } F2 \cap bA \neq \phi$$
$$f2 \text{ of } F2 \text{ such that } f2 \subset A$$
$$\text{stitch } f1 \text{ and } f2 \to \text{collar } A \cup B$$

The set above is described as follows: a first face (F1) of a first object (A) such that the first face intersects with the boundary of a second object (bB), where the intersection is not equal to zero (i.e., is not a null set). A first fragment (f1) of a first face such that the first fragment is inside the second object. A second face (F2) of a second object (B) such that the second object intersects with the boundary of the first object (bA). A second fragment (f2) of the second face such that the second fragment is inside the first object. As a result, the first fragment and the second fragment are stitched together to result in the union of the first object and the second object.

The intersection of a first object and a second object is defined by the following set:

$$F1 \text{ of } A \text{ such that } F1 \cap bB \neq \phi$$
$$f1 \text{ of } F1 \text{ such that } f1 \not\subset B$$
$$F2 \text{ of } B \text{ such that } F2 \cap bA \neq \phi$$
$$f2 \text{ of } F2 \text{ such that } f2 \not\subset A$$
$$\text{stitch } f1 \text{ and } f2 \to \text{collar } A \cap B$$

The set above is described as follows: a first face (F1) of a first object (A) such that the first face intersects with the boundary of a second object (bB), where the intersection is not equal to zero (i.e., is not a null set). A first fragment (f1) of a first face such that the first fragment is outside the second object. A second face (F2) of a second object (B) such that the second object intersects with the boundary of the first object (bA). A second fragment (f2) of the second face such that the second fragment is outside the first object. As a result, the first fragment and the second fragment are stitched together to result in the intersection of the first object and the second object.

The subtraction of a second object from a first object is defined by the following set:

$$F1 \text{ of } A \text{ such that } F1 \cap bB \neq \phi$$
$$f1 \text{ of } F1 \text{ such that } f1 \subset B$$
$$F2 \text{ of } B \text{ such that } F2 \cap bA \neq \phi$$
$$f2 \text{ of } F2 \text{ such that } f2 \not\subset A$$
$$\text{stitch } f1 \text{ and } f2 \to \text{collar } A - B$$

The set above is described as follows: a first face (F1) of a first object (A) such that the first face intersects with the boundary of a second object (bB), where the intersection is not equal to zero (i.e., is not a null set). A first fragment (f1) of a first face such that the first fragment is inside the second object. A second face (F2) of a second object (B) such that the second object intersects with the boundary of the first object (bA). A second fragment (f2) of the second face such that the second fragment is outside the first object. As a result, the first fragment and the second fragment are stitched together to result in the subtraction of the second object from the first object. A subtraction of the first object from the second object would reference the order of the objects, faces, and fragments in the set described above.

In some embodiments, when a pair of faces is large and complex or if an interaction region consists of a substantial portion of the pair of faces, the face-cutting module 206 may build a deep treelet. This will have a negative influence on performance, both for treelet creation and for cutting with treelets. As a result, in some embodiments the face-cutting module 206 uses sparse octree binning to further subdivide the set of faces so that each cell contains a certain fixed maximum number of faces. If a cell contains only first faces (and not second faces), the face-cutting module 206 may discard the first faces. In some embodiments, the face-cutting module 206 repeats the process of determining overlap between faces in a pair of intersecting convex polygonal faces until the pairs in the list have all been processed. For example, the face-cutting module 206 may determine a first face of a 3D object that overlaps with a second face of the 3D object, identify a first fragment of the first face that does not overlap with the second face, and identify a second fragment of the second face that does not overlap with the first face.

A vertex can be determined by a triplet of independent planes. However, an infinite number of triplets of planes that can define one vertex. It is important to be able to identify unique vertices as they are used to retrieve half edges. The face-cutting module 206 can use the exact predicate orientation (a, b, c, d) to determine the relative position of the vertex defined by planes (a, b, c) relative to plane d. In some embodiments, the face-cutting module 206 determines whether a vertex of a first face lies below, above, or on a plane of the second face. In some embodiments, the face-cutting module 206 determines whether the vertex lies below, above, or on a plane using adaptive precision floating-point arithmetic.

The face-cutting module 206 may identify subsequent fragments from remaining pairs in the list of intersecting convex polygonal faces.

In some embodiments, the mesh-extraction module 210 receives fragments from the face-cutting module 206 and generates a topological structure from the fragments. The mesh-extraction module 210 may identify vertices from three or more independent planes on which the vertices lie. Similarly, edges can be identified by two or more independent planes. If edges do not match exactly between adjacent faces, for example if the edge is split on one side but not on the other, the mesh-extraction module 210 may resolve the T-junction using the exact orientation predicate and the topological structure built so far.

Once the mesh-extraction module 210 assembles all the fragments, the mesh-extraction module 210 obtains a set of connected faces that result from the interaction of two operands. Some of the faces do not belong to the final result and are discarded in the next step.

The mesh-extraction module 210 may discard faces for multiple reasons. In one example, if any face of one operand is strictly contained inside another operand, the mesh-extraction module 210 discards the face. In examples where the face of an operand is not strictly contained within the other operand, the process is more subtle and complex. Instead of the face-cutting module 206 trying to classify all the fragments, the mesh-extraction module 210 relies on the propagation of the topology of the mesh to generate a closed two-manifold mesh.

Some of the fragments are already classified. For example, if one fragment's edge lies on the inside or on the surface of the other object, the mesh-extraction module 210 classifies the fragment as either in or out. Other fragments resulting from indirect cuts or cuts from octree cells are considered to be undetermined.

The mesh-extraction module 210 uses classified fragments to create an intersection collar. As the completed topological structure is a closed manifold mesh, it is possible to walk from the collar faces and propagate to the neighboring faces. The mesh-extraction module 210 adds the faces reached from the collar to the mesh.

The mesh-extraction module 210 maintains a list of added fragments that are added to the topological structure and discarded fragments that are not added to the topological structure. In some embodiments, the mesh-extraction module 210 transmits information incrementally about the list of added fragments and discarded fragments to a user device 115. For example, the mesh-extraction module 201 may transmit information about the list periodically (e.g., every second, every five seconds), each time a fragment is added to the topological structure, every five times a fragment is added to the topological structure, etc. As a result, the user device 115 may incrementally form the topological structure.

Turning to FIG. 4, an example of a collar that is formed from fragments of objects is illustrated. In this example, the first object is a sphere and the second object is a cube.

In the first example, a collar 400 of determined faces is created from the lighter-colored faces of the first object 405 (i.e., the sphere) and the darker-colored faces of the second object 406 (i.e., the cube). The collar 400 is an amalgam of the faces of the first object that are sticking outside the faces of the second object, the faces of the second object that are sticking outside the faces of the first object, or fragments of the faces where the face is crossing a boundary of inside or outside the other face. When the faces are unambiguously classified this way, they are added to a final result.

In the second example, the collar 410 includes the determined faces from the first example and undetermined faces 412a, 412b.

The third example 415 includes the collar and fragments 417a, 417b from an octree that are added to the collar.

In the fourth example 420, the fragments 422a, 422b from the outer collar faces from the original mesh are added to the collar. The fragments 422a, 422b are faces of the first object and the second object that touch and are from original meshes before the CSG operation was applied.

The fifth example 425 illustrates a structured mesh at the end of the process that result from propagation.

Example Methods

FIG. 5 is a flow diagram of a method 500 to generate a topological structure, according to some embodiments described herein. Primitives as a structured mesh 505 are received and a CSG operation 510 is performed on the primitives. At a localization step, a series of data structure queries are performed to obtain sorted intervals 515. A sweep and prune 520 algorithm is applied that is used to identify a set of intersecting faces 525. For large and complex objects, the set of intersecting faces 525 are subdivided through the use of a sparse octree 530. At a face cutting step, a treelet is created 535 from the set of intersecting faces. The treelet is used to identify treelet intersections 540 and disconnected fragments 545 are identified. At a mesh extraction step, the disconnected fragments 545 are assembled to create a topology 550. Some fragments are discarded 555 and the other fragments are connected 560. At an update step, a list of changes is maintained 565 in order to update the structures in a localization box 570 (i.e., by updating the sorted intervals 515). This makes the localization step in the next iteration more efficient. The process then repeats as additional CSG operations are performed.

FIG. 6 is an example flow diagram of a method 600 to generate a topological structure from treelets. In some embodiments, the method 600 is performed by the metaverse engine 103 that is stored on the server 101. In some embodiments, the method 600 is performed in part by the metaverse engine 103 and in part by the metaverse application 104 stored on the user device 115.

The method 600 may begin at block 602. At block 602, a list of intersecting convex polygonal faces is created based on results of a CSG operation that is applied to a first object and a second object. In some embodiments, before block 602 the method may include applying the CSG operation to the first object and the second object, determining triangles that are left unchanged by the CSG operation, applying a sweep and prune algorithm to the triangles to determine a list of intersecting triangles, and extracting the list of intersecting convex polygonal faces from the list of intersecting triangles. Block 602 may be followed by block 604.

At block 604, a first treelet is generated from a first set of faces associated with the first object from each pair in the list of intersecting convex polygonal faces. Block 604 may be followed by block 606.

At block 606, it is determined whether first fragments in the first set of faces are inside the second object. In some embodiments, determining whether the first fragments in the first set of faces are inside the second object is based on determining whether a vertex of the first fragments lie below, above, or on a plane of the second set of faces. Block 606 may be followed by block 608.

At block 608, a second treelet is created from the second faces associated with the second object from each pair in the list of intersecting convex polygonal faces. Block 608 may be followed by block 610.

At block 610, it is determined whether second fragments in the second set of faces are inside the first object. Block 610 may be followed by block 612.

At block 612, responsive to the identifying, it is determined whether there is a union, intersection, or subtraction of the first object and the second object for each pair in the list of intersecting convex polygonal faces. Block 612 may be followed by block 614.

At block 614, the set of first fragments and the set of second fragments are assembled to create a topological structure based on the determinations of union, intersection, and subtraction. The topological structure may be a collar that is added to a mesh created by the CSG operation. In some embodiments, the method further includes maintaining a list of added fragments that are added to the topological structure and discarded fragments that are not added to the topological structure and transmitting, from a server to a client device, information about the list of added fragments and discarded fragments, wherein transmitting the information about the list incrementally enables the client device to incrementally form the topological structure.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., user device only; client+server device; etc.) and where the data analysis is performed (e.g., user device only; client+server device; etc.). Data are utilized for the specific purposes as described herein. No data is shared with third parties without express user permission.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMS, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method to create a topological structure, the method comprising:

applying a constructive solid geometry (CSG) operation to a first object and a second object;

determining triangles that are left unchanged by the CSG operation;

applying a sweep and prune algorithm to the triangles to determine a list of intersecting triangles;

extracting a list of intersecting convex polygonal faces from the list of intersecting triangles;

generating a first treelet from a first set of faces associated with the first object from respective pairs of intersecting convex polygonal faces in the list of intersecting convex polygonal faces;

identifying whether first fragments in the first set of faces are inside second objects;

generating a second treelet from a second set of faces from the respective pairs in the list of intersecting convex polygonal faces;

identifying whether second fragments in the second set of faces are inside the first object;

responsive to the identifying, determining whether there is a union, intersection, or subtraction for the respective pairs in the list of intersecting convex polygonal faces; and assembling the set of first fragments and the set of second fragments to create a topological structure based on the determinations of union, intersection, or subtraction.

2. The method of claim 1, wherein further comprising:

maintaining a list of added fragments and discarded fragments, wherein the added fragments are added to the topological structure and discarded fragments are excluded from the topological structure; and performing subsequent CSG operations to iteratively add subsequent fragments to the topological structure to form an avatar for a virtual experience.

3. The method of claim 1, wherein identifying whether the first fragments in the first set of faces are inside the second object is based on determining whether a vertex of the first fragments lie below, above, or on a plane of the second set of faces.

4. The method of claim 1, further comprising:

maintaining a list of added fragments and discarded fragments, wherein the added fragments are added to the topological structure and discarded fragments are excluded from the topological structure; and transmitting, from a server to a client device, information about the list of added fragments and discarded fragments, wherein transmitting the information about the list incrementally enables the client device to incrementally form the topological structure.

5. The method of claim 1, wherein the topological structure is an intersection collar that is added to a mesh created by the CSG operation.

6. The method of claim 1, wherein the topological structure is a closed two-manifold mesh.

7. The method of claim 1, wherein union of the first object and the second object is determined based on determining that:

a first face of the first object intersects with the second object;

a first fragment of the first face is inside the second object;

a second face of the second object intersects with the first object; and a second fragment of the second face is inside the first object.

8. The method of claim 1, wherein intersection of the first object and the second object is determined based on determining that:

a first face of the first object intersects with the second object;

a first fragment of the first face is outside the second object;

a second face of the second object intersects with the first object; and a second fragment of the second face is outside the first object.

9. The method of claim 1, wherein subtraction of the second object from the first object is determined based on determining that:

a first face of the first object intersects with the second object;

a first fragment of the first face is inside the second object;

a second face of the second object intersects with the first object; and a second fragment of the second face is outside the first object.

10. A device to create a topological structure, the device comprising:

a processor; and a memory coupled to the processor, with instructions stored thereon that, when executed by the processor, cause the processor to perform operations comprising:

applying a constructive solid geometry (CSG) operation to a first object and a second object;

determining triangles that are left unchanged by the CSG operation;

applying a sweep and prune algorithm to the triangles to determine a list of intersecting triangles;

extracting a list of intersecting convex polygonal faces from the list of intersecting triangles;

generating a first treelet from a first set of faces associated with the first object from respective pairs of intersecting convex polygonal faces in the list of intersecting convex polygonal faces;

identifying whether first fragments in the first set of faces are inside second objects;

generating a second treelet from a second set of faces from the respective pairs in the list of intersecting convex polygonal faces;

identifying whether second fragments in the second set of faces are inside the first object;

responsive to the identifying, determining whether there is a union, intersection, or subtraction for the respective pairs in the list of intersecting convex polygonal faces; and assembling the set of first fragments and the set of second fragments to create a topological structure based on the determinations of union, intersection, or subtraction.

11. The device of claim 10, wherein the operations further comprise:

maintaining a list of added fragments and discarded fragments, wherein the added fragments are added to the topological structure and discarded fragments are excluded from the topological structure; and performing subsequent CSG operations to iteratively add subsequent fragments to the topological structure to form an avatar from a virtual experience.

12. The device of claim 10, wherein identifying whether the first fragments in the first set of faces are inside the second object is based on determining whether a vertex of the first fragments lie below, above, or on a plane of the second set of faces.

13. The device of claim 10, wherein the operations further comprise:

maintaining a list of added fragments and discarded fragments, wherein the added fragments are added to the topological structure and discarded fragments are excluded from not added to the topological structure; and transmitting, from a server to a client device, information about the list of added fragments and discarded fragments, wherein transmitting the information about the list incrementally enables the client device to incrementally form the topological structure.

14. The device of claim 10, wherein the topological structure is an intersection collar that is added to a mesh created by the CSG operation.

15. A non-transitory computer-readable medium with instructions to create a topological structure stored thereon that, when executed by one or more computers, cause the one or more computers to perform operations, the operations comprising:

applying a constructive solid geometry (CSG) operation to a first object and a second object;

determining triangles that are left unchanged by the CSG operation;

applying a sweep and prune algorithm to the triangles to determine a list of intersecting triangles;

extracting a list of intersecting convex polygonal faces from the list of intersecting triangles;

generating a first treelet from a first set of faces associated with the first object from respective pairs of intersecting convex polygonal faces in the list of intersecting convex polygonal faces;

identifying whether first fragments in the first set of faces are inside second objects;

generating a second treelet from a second set of faces from the respective pairs in the list of intersecting convex polygonal faces;

identifying whether second fragments in the second set of faces are inside the first object;

responsive to the identifying, determining whether there is a union, intersection, or subtraction for the respective pairs in the list of intersecting convex polygonal faces; and assembling the set of first fragments and the set of second fragments to create a topological structure based on the determinations of union, intersection, and subtraction.

16. The computer-readable medium of claim 15, wherein the operations further comprise:

maintaining a list of added fragments and discarded fragments, wherein the added fragments are added to the topological structure and discarded fragments are excluded from the topological structure; and performing subsequent CSG operations to iteratively add subsequent fragments to the topological structure to form an avatar for a virtual experience.

17. The computer-readable medium of claim 15, wherein identifying whether the first fragments in the first set of faces are inside the second object is based on determining whether a vertex of the first fragments lie below, above, or on a plane of the second set of faces.

18. The computer-readable medium of claim 15, wherein the operations further comprise:

maintaining a list of added fragments and discarded fragments, wherein the added fragments are added to the topological structure and discarded fragments are excluded from the topological structure; and transmitting, from a server to a client device, information about the list of added fragments and discarded fragments, wherein transmitting the information about the list incrementally enables the client device to incrementally form the topological structure.

19. The computer-readable medium of claim 15, wherein the topological structure is an intersection collar that is added to a mesh created by the CSG operation.

20. The computer-readable medium of claim 15, wherein the topological structure is a closed two-manifold mesh.

* * * * *